(12) United States Patent
Dusseux

(10) Patent No.: US 6,317,519 B2
(45) Date of Patent: *Nov. 13, 2001

(54) PROCESS AND DEVICE FOR CODING BY LUMINANCE ESTIMATION

(75) Inventor: Jean-Christophe Dusseux, Rennes (FR)

(73) Assignee: Thomson Licensing S.A., Boulogne (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,524

(22) Filed: Feb. 9, 1998

(30) Foreign Application Priority Data

Feb. 10, 1997 (FR) .................................. 97 01509

(51) Int. Cl.[7] ........................................ G06K 9/36
(52) U.S. Cl. ............................................ 382/237
(58) Field of Search .................... 382/164, 165, 382/166, 232, 236, 238, 246; 348/154, 155, 392, 396, 398, 402, 413, 416, 488, 595, 699, 700, 701

(56) References Cited

U.S. PATENT DOCUMENTS

| | | | |
|---|---|---|---|
| 4,464,676 | * | 8/1984 | Russell et al. ............................ 358/37 |
| 5,001,560 | | 3/1991 | Ericsson .................................. 358/133 |
| 5,146,325 | * | 9/1992 | Ng ............................................ 382/236 |
| 5,210,605 | * | 5/1993 | Zaccarin et al. ........................ 348/413 |
| 5,227,878 | * | 7/1993 | Puri et al. ................................ 348/413 |
| 5,267,334 | * | 11/1993 | Normille et al. ....................... 382/236 |
| 5,339,164 | * | 8/1994 | Lim .......................................... 348/426 |
| 5,353,061 | * | 10/1994 | Rodriguez et al. ..................... 348/409 |
| 5,440,346 | * | 8/1995 | Alattar et al. ........................... 348/420 |
| 5,448,297 | * | 9/1995 | Alattar et al. ........................... 348/415 |
| 5,485,533 | * | 1/1996 | Hatano et al. .......................... 382/236 |
| 5,491,513 | * | 2/1996 | Wickstrom et al. ................... 348/390 |
| 5,509,089 | * | 4/1996 | Ghoshal .................................. 382/236 |
| 5,510,838 | * | 4/1996 | Yomdin et al. ......................... 348/384 |
| 5,544,263 | * | 8/1996 | Iwamura ................................. 382/236 |
| 5,561,463 | * | 10/1996 | Thomas et al. ........................ 348/392 |
| 5,561,477 | * | 10/1996 | Polit ........................................ 348/700 |
| 5,565,920 | * | 10/1996 | Lee et al. ................................ 348/398 |
| 5,586,200 | * | 12/1996 | Devaney et al. ....................... 382/232 |
| 5,732,155 | * | 3/1998 | Saito ........................................ 382/236 |

FOREIGN PATENT DOCUMENTS

| | | | |
|---|---|---|---|
| 710 031 A2 | 5/1996 | (EP) | ................................ H04N/7/26 |
| 720 384 A1 | 7/1996 | (EP) | ................................ H04N/7/36 |
| 2 301 972A | 12/1996 | (GB) | ................................ H04N/7/28 |

OTHER PUBLICATIONS

M. H. Hayes, Iterated function systems for image and video coding, at the International Workshop on Image Processing: Theory, Methodology, Systems and Applications, Budapest, Hungary, Jun. 20–22, 1994, ISSN 0866–5583, Journal on Communications, May–Jun. 1994, Hungary, pp. 11–19.

* cited by examiner

*Primary Examiner*—Jose L. Couso
(74) *Attorney, Agent, or Firm*—Joseph S. Tripoli; Joseph J. Laks; Ronald H. Kurdyla

(57) ABSTRACT

The invention relates to a process for coding digital data from a sequence of video images carrying out a coding of the difference in luminance (7) between an image segment to be coded and a corresponding segment of an image predicted from a so-called reference image, characterized in that the prediction is made as a function of a luminance compensation (12) of values of luminance of the reference image.

Figure 1:
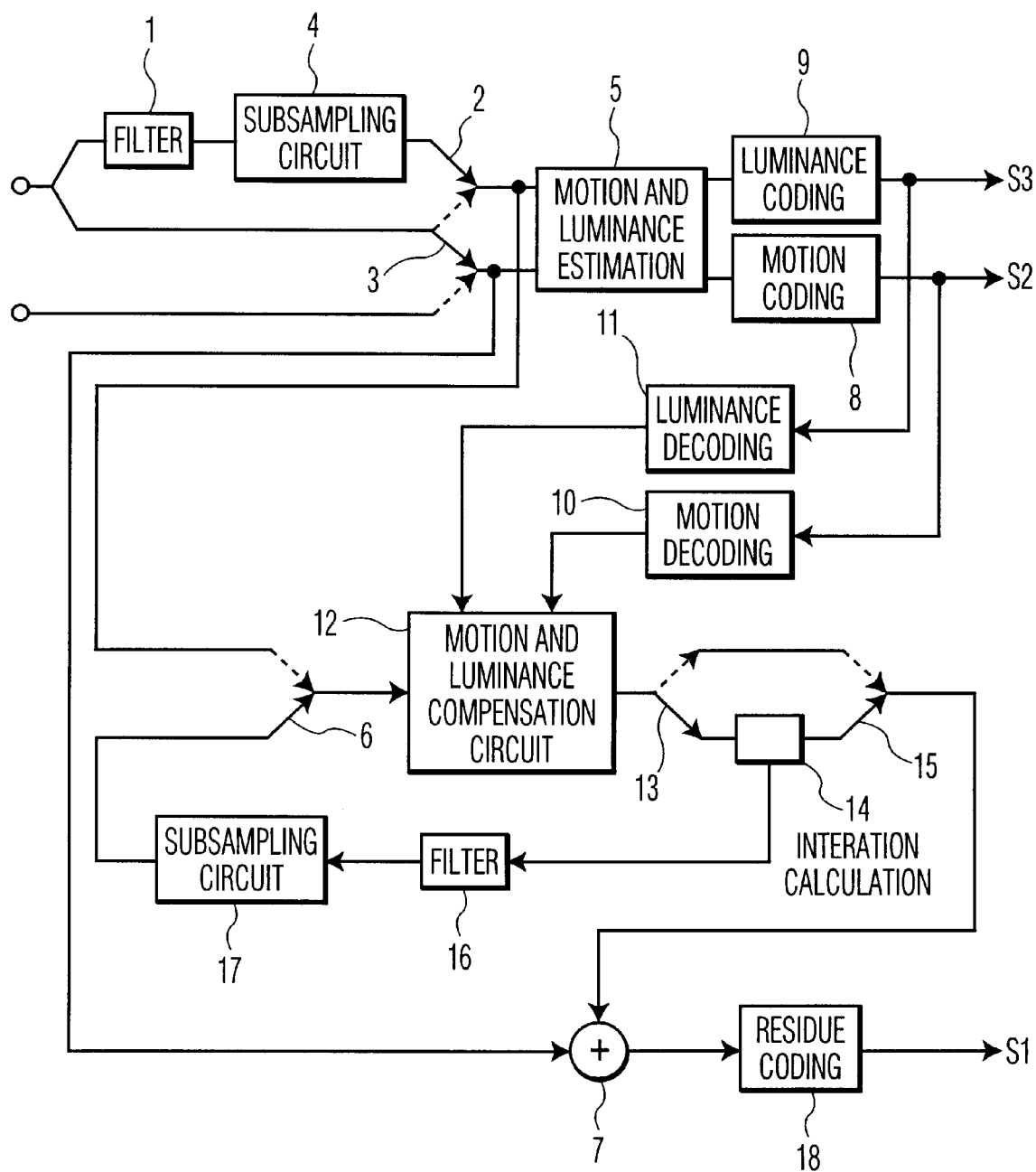

The field is that of the compression of digital video data.

18 Claims, 2 Drawing Sheets

PROCESS AND DEVICE FOR CODING BY LUMINANCE ESTIMATION

The technical field to which the present invention relates is that of the coding of digital video image sequences. The current problem within this field is that of compressing the visual information by exploiting a set of parameters for regulating the cost and quality of this compression. It is thus possible to comply with a certain number of constraints which depend essentially on the intended application. Quality criteria may compel the information to be compressed without impairing its final reconstruction. Such is the case, for example, in teledetection or production applications and also storage applications. On the other hand, the quality requirement may be less demanding, although greater than a required minimum, giving way to the need to compress the information in accordance with the capacities of a given transmission channel. Such is, for example, the case in videophone applications (over ISDN standing for Integrated Services Digital Network or STN standing for Switched Telephone Network), or communication applications on battlefields. Finally, the most common case amounts to balancing the degradations in quality with the performance in compression. Such is the case in broadcasting applications, or again video distribution applications (video on Compact Disc such as *Digital Video Disc*). Added to this there are constraints of a practical nature.

The main coding methods may be viewed as being a combination of several techniques used on the basis of their properties.

Thus, there may be distinguished:
coding by prediction which consists on the one hand in providing an estimate and on the other hand in correcting it by taking into account the estimation error;
coding by transform which enables the information to be made more concise, by decorrelating it through a change of representation space;
coding by approximation which replaces information with other predefined or at least simplified information.

The latest developments in this field rely on prediction through motion. On the one hand the Discrete Cosine Transformation (DCT) makes it possible locally to reduce the redundancy of an image in intra mode. On the other hand the objective of motion compensation is to reduce temporal redundancy. The motion information corresponds to the local similitude ties between a so-called "reference" image and that currently being investigated, and is interpreted through the concept of the physical motion of the underlying scene. Thus, consider a partition of an image into blocks; for each of these blocks, a search is made in the other image investigated for the most similar block. The motion (horizontal, vertical) is then the difference in location between the blocks (line-wise, column-wise) in relation to the location of the first, and is coded once per block. This motion information is supplemented with the data regarding the residues from this prediction (values of the error in the prediction through motion). This is processed in a manner similar to the data of intra images.

The most recent schemes for coding image sequences exploit the motion data through a prediction. The MPEG2 approach is a good example of this.

The improvements obtained in data compression may however be deemed inadequate and better image quality may be desired for a given bit rate or a smaller bit rate, and hence coding cost, for a given final quality.

The invention which is the subject of the present patent application is aimed at remedying the aforementioned drawbacks.

To this end, the subject of the invention is a process for coding digital data from a sequence of video images carrying out a coding of the difference in luminance between an image segment to be coded and a corresponding segment of an image predicted from a so-called reference image, characterized in that the prediction is made as a function of a luminance compensation of values of luminance of the reference image.

Its subject is also a device for coding digital data from a video sequence for the implementation of the process comprising a motion estimation circuit for calculating vectors of motion between two images, a motion compensation circuit based on a reference image for calculating a predicted image, a subtractor for subtracting the predicted image from the current image for calculating a residue to be coded, characterized in that it comprises a circuit for estimating luminance between the two same images and a luminance compensation circuit receiving the information from the luminance estimation and motion estimation circuit for calculating the predicted image.

Its subject is also a device for decoding digital data coded according to the preceding process, for calculating an image reconstructed from a residue and a predicted image, characterized in that it comprises a circuit for compensating luminance as a function of luminance vectors which are luminance estimation information items, for calculating the predicted image.

The process consists in enhancing the prediction through motion compensation, with a so-called luminance compensation.

It also makes the possible to replace an intra image by a so-called auto-compensated image using the same mechanism as inter compensation based on motion, luminance and residue data.

The proposed invention makes it possible to reduce the amount of information contained in the residue, irrespective of the method of motion analysis used before the estimation of luminance. The enhancing of the model of motion by a so-called luminance approach significantly reduces the residue, and this reduction in residual information being larger than the corresponding addition of luminance information, the novel coding of inter images is more powerful.

Moreover, the invention proposes a unified coding scheme where the difference between the approach for intra images and that for inter images is small. The implementation of the invention is simplified and hence cheaper owing to the fact that it utilizes elements of existing schemes differently, by incorporating therewith a method which is of low complexity from a hardware point of view.

The invention is independent of the particular coding of each type of information item (motion, luminance, residue). The method used can be incorporated into the MPEG2 coding schemes, even though the data regarding luminance is coded In addition to the standard data.

These luminance compensation techniques are especially effective when there is a change of scene lighting which, in the prior art, would customarily give rise to expensive intra coding.

Figure 2:
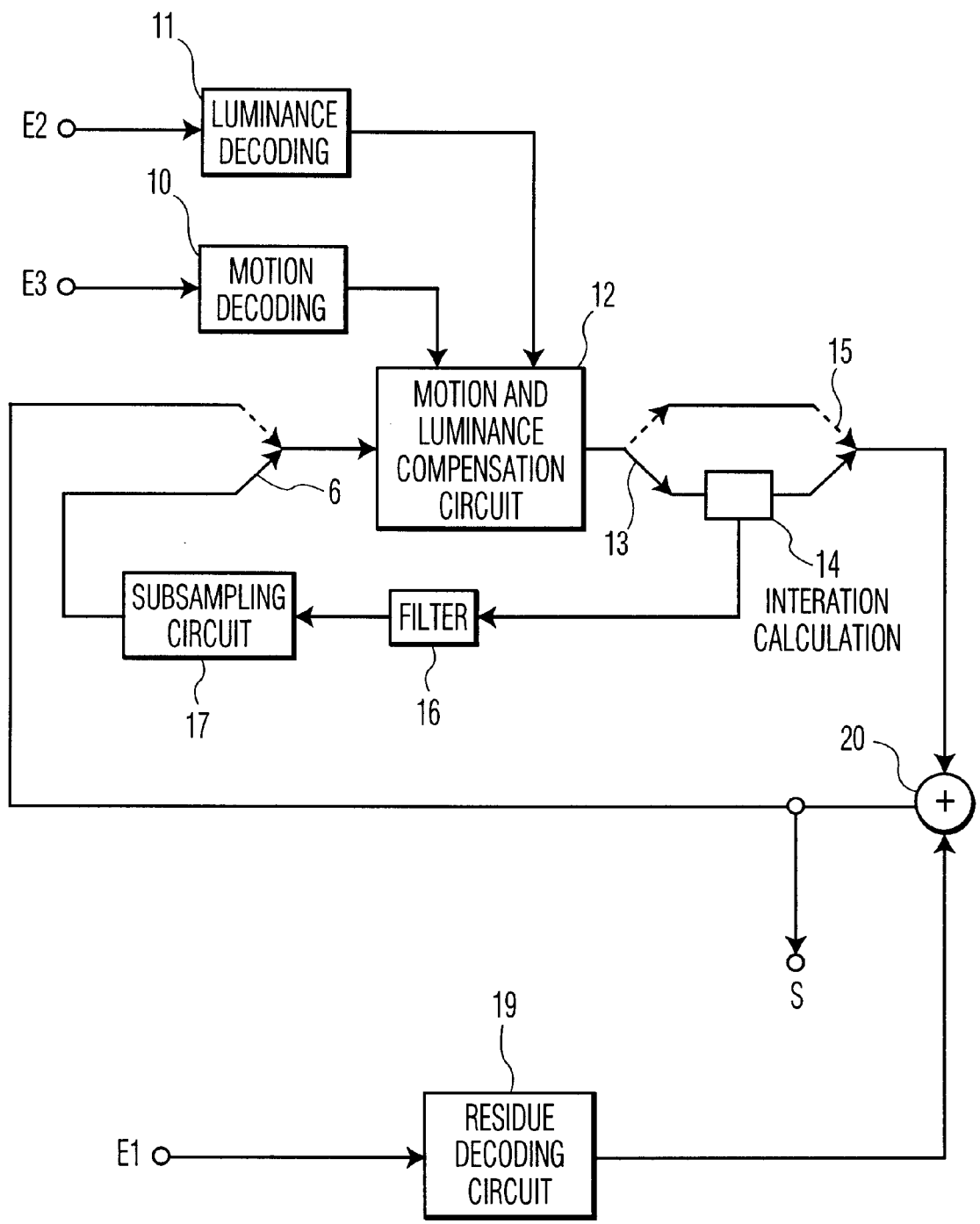

Other features and advantages of the invention will emerge clearly in the following description given by way of non-limiting example and offered in conjunction with the appended figures which represent:

FIG. 1 a diagram of the coding circuit according to the invention;

FIG. 2 a diagram of the decoding circuit according to the invention.

The process according to the invention is described below with the aid of the diagram of the device represented in FIG. 1.

The coding device comprises a first and a second input. An image is presented to the first input at the instant t and an image is presented to the second input at the instant t+1. The first input is linked in parallel with the input of a filtering circuit 1, with a first input of a switch with two inputs and one output 2 and with a first input of a switch with two inputs and one output 3. The output of the filtering circuit 1 is linked to the input of a sub-sampling circuit 4 and the output of the latter is linked to the second input of the switch 2.

The second input of the device is linked to the second input of the switch 3.

The switches 2 and 3 are two-position switches, position 1 being represented by broken lines in the figure and corresponding to a first input and position 2 by solid lines corresponding to a second input. Thus, position 1 of the switch 2 corresponds to its first input and position 1 of the switch 3 corresponds to its second input. All the switches described hereafter have two positions 1 and 2, these switches being simultaneously in the same position 1 or 2 represented in the diagram by broken and solid lines respectively.

The outputs of the switches 2 and 3 are linked to two inputs of a motion and luminance estimation circuit 5 as well as, respectively, to a first input of a switch with two inputs and one output 6 corresponding to position 1 and to a first input of an adder circuit 7. A first output of the luminance and motion estimation circuit is linked to the input of a circuit for coding motion 8 and a second output is linked to the input of a circuit for coding luminance 9. The respective outputs S2 and S3 of each of the coding circuits correspond to the outputs of the coding device described. They are also linked respectively to a motion decoding circuit 10 and to a luminance decoding circuit 11, the output of each of these circuits being respectively linked to a first and second input of a motion and luminance compensation circuit 12. The output of the switch 6 is linked to a third input of this circuit 12. The output of the motion and luminance compensation circuit is linked to the input of a switch with one input and two outputs 13. A first output of this switch, corresponding to position 2, is linked to the input of an iteration calculation circuit 14, a first output of this circuit being for its part linked to a first input of a switch with two inputs and one output 15 and corresponding to position 2 and a second output of this circuit being linked to the input of a filter 16. The output of the filter 16 is linked to the second input of the switch 6 by way of a sub-sampling circuit 17. The second output of the switch 13 is linked to the second input of the switch 15. The output of the switch 15 is linked to the second input of the adder circuit 7. The output of this circuit is linked to the input of a residue coding circuit 18 whose output S1 is the third output of the coding device.

The digital images I(t) and I(t+1), corresponding to the instants t and t+1, are presented to the input of the device. These are for example two successive images in a sequence of images.

The first mode of coding described is the inter mode of coding corresponding to position 1 of the switches, as represented by broken lines in the figure.

In this first mode, the image I(t) is transmitted on the first input of the motion and luminance estimator 5 via the switch 2 and the image I(t+1) is transmitted on the second input of this circuit 5 by way of the switch 3. The circuit 5 therefore carries out an estimation of motion between the image I(t) and the image I(t+1) and calculates a motion vector in accordance with a conventional method such as, for example, block matching. This method, in which notion estimation is performed per image block, utilizes the least squares method, for example.

Estimated values of luminance are calculated for each of the image blocks with the aid of estimation parameters (or Prediction parameters), $c_s$ and $b_o$, as explained later and as a function of the motion estimation calculated by this circuit.

This so-called luminance compensation appears as a supplement to the motion compensation. It is independent of the latter and of the nature of the motion results. In fact the luminance compensation fully exploits, by statistics, the ties discovered through the motion between two blocks or two neighbourhoods. In practice, this method of compensation estimates a posteriori the linear relation existing between the grey levels of a block or of a neighbourhood and those of the other block or neighbourhood previously associated through the motion analysis.

The formulation of the motion analysis problem may be as follows:

Consider an element of a reference image I such as a point (x,y,z), neighbourhood, block, region etc. It is required to associate another element of the same kind in the image investigated I', point (x',y',z'), neighbourhood, block, region etc. which complies with correspondence criteria utilizing known methods such as the method of east squares, the gradient method etc. and interpreted by the concept of motion.

The notation z and z' denotes the values of grey levels which correspond respectively to the co-ordinates (x,y) and (x',y') in the images I and I'. When the transformation associated with the motion is chosen to be linear (modelling of linear 2D motion), the parameters to be estimated may be described as follows:

$$\begin{pmatrix} x' \\ y' \\ z' \end{pmatrix} = \begin{bmatrix} a & b & 0 \\ c & d & 0 \\ 0 & 0 & 1 \end{bmatrix} \cdot \begin{pmatrix} x \\ y \\ z \end{pmatrix} + \begin{pmatrix} t_x \\ t_y \\ 0 \end{pmatrix} \quad (1)$$

The parameters (a,b,c,d) are then associated with the rotations, and the parameters (tx,ty,0) with the translations. In this formulation, the rotations can in fact be ignored, returning to the expression of the first motion models.

The formulation of the luminance analysis problem can be as follows: starting from the preceding data (data regarding correspondence between elements of two images, which defines, as it were, pairs of image elements), it is required to estimate coefficients complementary to those of the motion and which will be associated with the grey levels. In practice, they make it possible to transform the grey levels of an image element so as to predict those of the associated element (hence the name luminance compensation). One method of estimating these values is that of least squares. Other solutions can be used and this example is in no way limiting. When the luminance transformation is chosen to be linear, the associated coefficients may be termed contrast scaling, $c_s$, and brightness offset, $b_o$. The following illustration takes account of this choice.

Thus the values a,b,c,d are regarded as known, as are $t_x$ and $t_y$.

$$\begin{pmatrix} x' \\ y' \\ z' \end{pmatrix} = \begin{bmatrix} a & b & e \\ c & d & f \\ g & h & c_s \end{bmatrix} \cdot \begin{pmatrix} x \\ y \\ z \end{pmatrix} + \begin{pmatrix} t_x \\ t_y \\ b_o \end{pmatrix} \quad (2)$$

It therefore remains to estimate e,f,g,h and $c_s$ and $b_o$. The first ones correspond to the correlation between the grey levels and the spatial positioning. They are generally very close to zero and they may therefore be ignored a priori and we can take e=f=g=h=0.0. Hence, finally, $c_s$ and $b_0$ remain to be estimated, corresponding in effect to luminance compensation. Thus the working matrix equation becomes:

$$\begin{pmatrix} x' \\ y' \\ z' \end{pmatrix} = \begin{bmatrix} a & b & 0 \\ c & d & 0 \\ 0 & 0 & c_s \end{bmatrix} \cdot \begin{pmatrix} x \\ y \\ z \end{pmatrix} + \begin{pmatrix} t_x \\ t_y \\ b_o \end{pmatrix} \quad (3)$$

The values of $c_s$ and $b_0$ relate to an image block, a pixel or a region depending on whether motion compensation is performed on an image block, a pixel or a region. The luminance compensation is therefore performed on the same image zone as the motion compensation.

In the ideal case where the motion is estimated perfectly and the assumptions of negligible lighting effects hold true (such assumptions, a model with no variation in luminance of the scene, are indeed made in the conventional utilization of motion compensation), or in the case in which the luminance compensation is ignored, $c_5$ and $b_o$ are equal to 1.0 and 0.0. In practice it turns out that either the motion is not estimated perfectly, for example the motion of the edges of objects when the motion is estimated per block, or the lighting effects assumptions are not entirely valid. Furthermore, it is simple to verify which statistical correlation exists for example between 2 matched-up elements (blocks or the like). The results indicate clearly the utility of having luminance compensation by estimating $c_s$ and $b_o$.

Nevertheless, a qualitative remark may already be made in this regard. A blurring effect, smoothing of the grey levels during luminance compensation, may be observed in particular in the zones with steep gradient or when the estimated motion includes a slight shift with respect to the actual motion. Thus, in this case, the luminance compensation is performed on pixels which do not correspond perfectly to the actual motion of the scene on account of this error. This may constrain its use according to the application, even if the residue error always remains smaller with the luminance compensation (for example for slowing down images where shifts in the estimated motion are observed fairly frequently, but which nevertheless allow very good interpolation of images). In this case, the criterion for deciding whether or not to use the luminance data for a block or given neighbourhood or a region, must be associated with a qualitative aspect o the residue. By transmitting the residue data it is of course possible to delete this blurring effect on the predicted image by luminance compensation, but the amount of information to be transmitted is related directly to this blurring effect. The decision criterion, such as, for example, the calculation of the energy in an image block, makes it possible to solve this problem by determining the most suitable mode of coding from among those which exist.

One possible estimator is that of least squares. Owing to the linear transformation assumption, this amounts to performing a linear regression between the 2 sets of values made up from the grey levels of each element of the matched-up pair. Let $(\phi_u)$ be the set of grey levels of element $E_1$ of image I, and let $(\psi_u)$ be the set of grey levels of element $E_2$ of image I'. It turns out that $E_1$ and $E_2$ have been matched up by the motion estimator. Next, it is required to determine an estimate of $c_s$ and $b_0$ such that we have:

$$E\{(\psi_{u_{est}} - \psi_u)^2\} \text{ minimum} \quad (4)$$

with $$\psi_{u_{est}} = c_s \cdot \phi_u + b_o \quad (5)$$

E, according to the terms used in statistics, corresponds to the mean value and the expression (4) therefore signifies that the mean value of the square of the differences over the block is minimized.

More concretely, consider an image block E1 of the current image comprising n pixels, the pixel in line i and column j having the luminance value $p_{i,j}$. With this block there is associated a predicted block E2 related on the basis of the calculated motion vector. Let $q_{k,l}$ be the actual value of the luminance of pixel k,l in line k and column 1 of this image block E2, the pixel matched -up with pixel i,j by motion estimation (rotation and translation or translation alone according co MPEG2) and $\hat{q}_{k,1}$ the predicted value. We have:

$$E(\varphi_u) = \frac{1}{n} \sum_{i,j} p_{i,j}$$

$$E(\psi_u) \frac{1}{n} \sum_{k,l} q_{k,l}$$

We seek $c_s$ and $b_0$ such that:

$$\frac{1}{n} \sum (\hat{q}_{k,l} - q_{k,l})^2 \text{ minimum}$$

with $$\hat{q}_{k,l} = c_s p_{i,j} + b_0$$

By calculating statistical data over the matched elements $E_1$ and $E_2$ it is therefore possible to estimate $c_s$ and $b_0$. In this case the following results are obtained:

$$c_s \cdot (E\{\phi_u^2\} - E\{\phi_u\}^2) = (E\{\phi_u \cdot \psi_u\} - E\{\phi_u\} \cdot E\{\psi_u\}) \quad (6)$$

and $$b_o = E\{\psi_u\} - c_s \cdot E\{\phi_u\} \quad (7)$$

The predicted blocks utilized for calculating the residues will then be calculated as a function of the luminance value of the current block of the current image and of the values $c_s$ and $b_o$ calculated for this current block by the luminance and motion estimation circuit 5. The motion vector information calculated by the motion estimation circuit, 5 is transmitted to the circuit for coding these motion vectors 8 and the luminance information such as the parameters $c_s$ and $b_o$ is transmitted to the luminance coding circuit 9.

This information is coded and then transmitted, via the outputs S2 and S3 of the device, to a decoder or to be, multiplexed with the residue data, likewise coded, available on the output S1 of the device, in the case in which only a single link is desired with each decoder, for example within the MPEG 2 framework. In the latter case, the multiplexer, not represented in the figure, retrieves all the information available on the outputs S1, S2, S3, of the device described, and incorporates it and transmits it in a conventional manner in a data stream or "bitstream" to the set of corresponding decoders.

The motion and luminance compensation circuit 12 retrieves the decoded information $c_o$ and $b_0$ as well as the decoded motion vectors output by the motion and luminance decoders so as to calculate predicted images. In this way, the motion and luminance information utilized by the motion compensation circuit takes account of the quantification interval used for the coding and is the same as that used by a compensation circuit utilized on the image decoder side, the motion and luminance decoding circuits being chosen to be identical on the image decoder side.

The compensation circuit receives, in inter mode, the image I(t) on its input. A predicted image is calculated from this image, the motion vectors and the parameters $c_s$ and $b_o$, and is transmitted from the output of the circuit to the subtractor 7. The image I(t) is received on the first input of this subtractor and the predicted image from the compensation circuit is subtracted so as to yield a residue at the output of the subtractor. These residue data are then coded in a conventional manner by utilizing, for example, the discrete cosine transform and are then transmitted on the output S1 and, as appropriate, multiplexed with the previously described motion and luminance information.

The intra mode of coding corresponds to the case in which an image I must be decoded independently of the images which precede it. This second mode of coding corresponds to position 2 of the switches, as represented by solid lines in the figure. The image I(t) is thus transmitted, in this mode, to a filter 1 which carries out linear filtering and into a sub-sampler 4 which performs a sub-sampling, for example by 2, so as to yield an image I(t). The degree of sub-sampling may equally well be fixed a priori or fixed each time the operation occurs. In the latter case, the value must necessarily be known (stored or transmitted) to the decoder. This image, for the processing to be followed, must have the same size as I and zero values are in fact appended spatially to the sampled image, still by way of this circuit 4, so as to yield I'(t). The image obtained is transmitted on the input of the luminance and motion estimator. This circuit receives the image I(t) on its second input and carries out an estimation of motion M between image I and the associated image I' or more Precisely a correlation, interpreted as a motion, between image I and the associated image I'. After this motion estimation which ideally is a zoom motion, a luminance estimation is made on the basis of the 2 images, and the motion data obtained.

As stated previously, one of the aspects of the invention is the utilization of the inter approach vis-a-vis the intra image. To do this, motion, luminance and residue data are therefore used. In fact the approach is motivated by the fixed point theorem of Banach (and hence is akin to the fractal techniques and IFS described, for example, in the technical article by M. H. Hayes entitled Iterated Function Systems for image and video coding of volume XLV of May–June 1994 of the Journal on Communications).

To give one example, the current image is divided into image blocks and then sampled and filtered and this filtered image is divided into image blocks of the same size as the blocks of the current image. A correlation is then performed between a current block of the current image and all the blocks or the blocks in the neighbourhood of the current block (for example belonging to a search window) of the filtered image.

Reconstruction of the intra image is achieved by cumulated compensation by applying the Banach theorem as explained below.

According to fractal theory, reconstruction may be interpreted as simply a motion and luminance compensation which should theoretically be repeated an infinity of times. To do this, it uses the results of image representation by IFS. In practice, convergence is fairly rapidly achieved, and the number of iterations amounts to between 3 and 10 at most. The same arbitrary or empirical choice must be fixed both on the coder and decoder side, so as to determine the residue during coding, and so as to have coherent results during image reconstruction.

As in the inter mode, the motion information (motion vectors) and luminance information (luminance vectors with components $c_s$ and $b_o$) is coded so as to be mutiplexed with the coded residue data, and is then decoded so as to be transmitted to the motion and luminance compensation circuit 12. In intra mode, the circuit receives on its third input an image calculated during a preceding iteration, except for the first iteration, rather than the image I(t). A first image is calculated from the motion and luminance information and is transmitted as output to a circuit for calculating the number of iterations and for routing 14 which retransmits the calculated image which it receives to the input of the compensation circuit across a filter 16 and a sub-sampler 17. After a given number of iterations the image thus reconstructed is the predicted image which is sent to the subtractor 7, by way of this circuit 14, so as so be subtracted from the image I(t).

The output from the luminance and motion compensation circuit is therefore linked to the input by way of a loop, thus allowing several successive compensations denoted c( ), associated with an operator f( ) consisting of a linear filtering of low-pass type and with a sub-sampling, for example a spatial division by two. The compensation c( ) relies just as much upon a motion compensation as upon a luminance compensation.

The "repeated" compensation consists in carrying out the following algorithm (with $I_o$ arbitrary and the number of iterations being fixed at 8):

initialization $I=I_o$ ith iteration (i<9): $I_i=c(f(I_{i-1}))$

8th and last iteration $I_8=c(f(I_7))$ $I_8$ is the reconstructed image.

Whereupon, it is apparent that the "customary" compensation consists of a "repeated" compensation for which:

the number of iterations is equal to 1 f( ) is replaced by the indentity $I_o$ is the reference image R.

This repeated compensation therefore makes it possible to calculate the prediction of I as a function of the decoded luminance and motion information. Thus the intra image can be processed like an inter image. There is an important consequence as regards the hardware realization in which he layout employed is the same or the intra images as for the inter images. The common points are then the following at coder level:

estimation of motion and associated coding;

luminance estimation according to the motion results and associated coding;

luminance and motion compensation on the basis of a reference image or the image arising from a linear filtering and sub-sampling and which may be repeated iteratively (intra case), so as to calculate the reconstructed image;

calculation of the residue by subtraction and associated coding.

FIG. 2 represents a decoding device or decoder according to the invention. In this figure the same references are adopted from the circuits common to the coder and to the decoder.

The motion and luminance information transmitted by the outputs S2 and S3 of the previously described coder are received on a first and second input E2 and E3 of the device. This information is transmitted respectively to the inputs of the motion 10 and luminance 11 decoding circuits of the type used at the coder. The outputs of these circuits are transmitted on a first and second input of a motion and luminance compensation circuit 12 of the type used at the coder. The third input of the decoder, E1, receives the residue data transmitted to a residue decoding circuit 19 and the output of the latter is linked to a first input of an adder 20. The output from this adder, which is also the output S from the decoder, is transmitted on a first input of a switch with two positions 6 corresponding to position 1, that is to say to the inter mode. The output of this switch is linked to a third input of the motion and luminance compensation circuit 12. The output of this circuit is linked to the input of a second switch with two positions 13. The first output of this switch which corresponds to the inter mode is linked to a first input of a third switch with two positions 15, also corresponding to the inter mode. The output of this third switch is linked to the second input of the adder circuit 20.

In intra mode, the input of the second switch 13 is linked to its second output, itself linked to the input of an iteration and routing calculation circuit 14. A first output of this circuit is linked to the second input of the switch 15. The second output is linked to the second input of the switch 6 by way of a filtering circuit 16 and of a sub-sampling circuit 17 placed in series.

The processing operations are here very similar to those for the coding. The motion, luminance and residue data transmitted by the coder and received respectively on the inputs E2, E3 and E1 are decoded by way of the decoding circuits 10, 11, 19 which carry out the operations inverse to those performed by the corresponding coding circuits 8, 9, 18 in the coder.

The inter mode decoding utilizes a reference image R. The luminance and motion compensation circuit 12 identifies the stored reference image R to be used (this may be predefined) which it compensates in terms of motion and luminance on the basis of the decoded motion and luminance information so as to yield a predicted image on its output. The residue decoded by the circuit 19 is appended to this image, by way of the adder 20 which thus yields the reconstructed image on its output. This image is the one available at the output S of the device described. This image is also the one which is returned as input to the compensation circuit and is possibly chosen as reference image for the inter decoding of a following image.

The intra mode decoding does not utilize a reconstructed image as reference image. It starts from an arbitrary reference image $I_o$ created by the circuit 12 or residing in a memory of the circuit 12 (which may of course be different from the reference image used by the coder). A first iteration is carried out on the basis of this image by traversing the filtering circuit 16, the sample circuit 17 and then the circuit 12 which carries out motion and luminance compensation as a function or the data transmitted by the coder, so as to yield a new image $I_1$ and so on. The image $I_7$, restricting ourselves to 7 iterations at coder level, is the reconstructed image transmitted to the adder by way of the iterations and routing calculation circuit 14.

The decoding device is described here with three inputs but it is obvious that, when the luminance and motion data are multiplexed with the coded residue data, a demultiplexer at the input of the decoder, not represented in the figure, is given the job of sorting these data so as to send them to the corresponding inputs E1, E2 or E3 of the decoder.

The points which are common to the coding and decoding devices are as follows:
motion-associated decoding;
luminance-associated decoding;
luminance and motion compensation based on a reference image (which may be a blank image memory in the starting intra case), and which may be iteratively repeated (intra case) by being associated with the following point;
linear filtering and sub-sampling depending on the case (intra/inter);
residue-associated decoding, and addition to the reconstruct on by compensation.

In general, it will be noted that no assumption has been made regarding the existing motion field. It may therefore be block-wise, region-wise, dense, more or less accurate, obtained by the method of least squares or by the gradient method.

This invention therefore makes it possible to improve the existing schemes for coding digital image sequences which are based on motion compensation. It uses existing processing operations (estimation, motion compensation; coding of the representation data; processing of the residue), whilst being defined independently of them.

It is particularly well suited to the novel methods of coding by region or zone which no longer utilize the residue data but the prediction data alone. It will be noted that the criterion for deciding whether or not to use the luminance data for a block or given neighbourhood or region can be associated with a qualitative aspect of the residue, that is to say with the degree of utilization of the residue in the envisaged application. One can in fact envisage, for example according to the novel techniques of coding by region or zone, transmitting the residue data only for certain images, by sampling for one image every n images or else not transmitting this information at all, the decoders then utilizing only the prediction information.

What is claimed is:

1. Process for coding digital data from a sequence of video images carrying out a coding of the difference in luminance between a current image segment to be coded and a predicted image segment to give a residue, comprising the steps of:
   determining a reference image segment in a reference image which is correlated to said current image segment, such reference image segment being defined by motion parameters;
   determining coefficients of a transformation for said current image segment by minimizing a luminance difference between the transformed current image segment and said reference image segment;
   compensating in luminance according to said transformation, said reference image segment to get said predicted image segment; and
   coding said digital data based upon the difference in luminance between the current image segment and the predicted image segment.

2. Process according to claim 1, wherein said reference image is a preceding image.

3. Process according to claim 2, wherein said reference image segment is the segment of the preceding image matched up by a motion vector calculated based on motion estimation.

4. Process for coding digital data from a sequence of video images carrying out a coding of the difference in luminance between a current image segment to be coded and a predicted image segment to give a residue, comprising the steps of:

determining a reference image segment in a reference image which is correlated to said current image segment, such reference image segment being defined by motion parameters;

determining coefficients of a transformation for said current image segment by minimizing a luminance difference between the transformed current image segment and said reference image segment;

compensating in luminance according to said transformation, said reference image segment to get said predicted image segment; and coding said digital data based upon the difference in luminance between the current image segment and the predicted image segment, wherein the transformation is a linear transformation according to the formula $\hat{q}=c_s p + b_o$, wherein $\hat{q}$ is the luminance of said transformed current image segment and p is the luminance of said current image segment, transformation coefficients $c_s$ and $b_0$ being determined by minimizing the sum, over the pixels relevant to the segment of the image to be coded, of the difference relating to the values of $\hat{q}$ and of q, q being the luminance of said reference image segment.

5. Process according to claim 4, wherein the reference image segment is an image block and further comprising the step of calculating the luminance vectors with components $c_s$ and $b_0$ at image block level.

6. Process according to claim 4, wherein the method of least squares is used for calculating the coefficients.

7. Process according to claim 4, further comprising the step of filtering and sub-sampling the current image to obtain the reference image.

8. Process according to claim 4, further comprising the step of calculating said predicted image segment by successive iterations of an image, each iteration including a filtering, a sub-sampling and luminance compensation.

9. Process for coding digital data from a sequence of video images carrying out a coding of the difference in luminance between a current image segment to be coded and a predicted image segment to give a residue, comprising the steps of:

determining a reference image segment in a reference image which is correlated to said current image segment, such reference image segment being defined by motion parameters;

determining coefficients of a transformation for said current image segment by minimizing a luminance difference between the transformed current image segment and said reference image segment;

performing successive iterations on an arbitrary image, such iteration comprising a filtering, a sub-sampling and a motion and luminance compensation according to said motion parameters and transformation coefficients to get said predicted image segment; and coding said digital data based upon the difference in luminance between the current image segment and the predicted image segment.

10. Device for coding digital data from a sequence of video images carrying out a coding of the difference in luminance between a current image segment to be coded and a predicted image segment to give a residue, said device comprising:

a luminance estimation circuit for receiving both a reference image and a said current image segment and calculating transformation coefficients therefrom by minimizing a luminance difference between the transformed current image segment and a reference image segment, a luminance compensation circuit for receiving both said reference image segment and said transformation coefficients and calculating said predicted image segment therefrom by implementing the transformation according to these coefficients.

11. Device for coding data from a sequence of video images carrying out a coding of the difference in luminance between a current image segment to be coded and a predicted image segment to give a residue, said device comprising:

a motion estimation circuit for receiving the current image and a reference image and calculating motion parameters therefrom;

a luminance estimation circuit for receiving both the reference image and the current image and calculating transformation coefficients therefrom; and a motion and luminance compensation circuit for receiving the motion parameters and transformation coefficients and calculating the predicted image segment by successive iterations of an arbitrary image according to the motion parameters and transform coefficients.

12. Device for decoding data in order to calculate an image reconstructed from a residue and a predicted image segment, said device comprising:

a motion and luminance compensation circuit;

a filter connected to an output of the motion and luminance compensation circuit;

a sub-sampler connected between the filter and an input of the motion and luminance compensation circuit, whereby an output of said motion and luminance compensation circuit is fed back to an input thereof through said filter and sub-sampler for calculating the predicted image based upon successive iterations of an arbitrary image, each iteration including filtering, sub-sampling and compensation as a function of transform coefficients and motion parameters.

13. Method for producing signals for transmission, said method comprising the steps of:

determining a reference image segment in a reference image which is correlated to said current image segment, such reference image segment being defined by motion parameters;

determining coefficients of a transformation for said current image segment by minimizing a luminance difference between the transformed current image segment and said reference image segment;

compensating in luminance according to said transformation, said reference image segment to get said predicted image segment;

calculating residue data items from the difference in luminance between the current image segment and the predicted image segment; and coding the residue data items to produce the signals for transmission.

14. Method for producing signals for transmission, said method comprising the steps of:

determining a reference image segment in a reference image which is correlated to said current image segment, such reference image segment being defined by motion parameters;

determining coefficients of a transformation for said current image segment by minimizing a luminance difference between the transformed current image segment and said reference image segment;

performing successive iterations on an arbitrary image, such iteration comprising a filtering, a sub-sampling and a motion and luminance compensation according to said motion parameters and transformation coefficients to get said predicted image segment; and coding said digital data based upon the difference in luminance between the current image segment and the predicted image segment;

calculating residue data items from the difference in luminance between the current image segment and the predicted image segment; and coding the residue data items to produce the signals for transmission.

15. Process for coding digital data from a sequence of video images carrying out a coding of the difference in luminance between a current image segment to be coded and a predicted image segment, to give a residue, comprising the steps of:

determining a reference image segment in a reference image which is correlated to said current image segment, such reference image segment being defined by motion parameters, determining transformation coefficients of a transformation for said current image segment by minimizing a luminance difference between the transformed current image segment and said reference image segment, compensating in luminance according to said transformation, said reference image segment to get said predicted image segment, coding said digital data based upon the difference in luminance between the current image segment and the predicted image segment to get coded data, and multiplexing said coded data with at least said transformation coefficients to form a bitstream.

16. Device for coding digital data from a sequence of video images comprising:

a luminance estimation circuit for receiving both a reference image and a current image segment and calculating transformation coefficients by minimizing a luminance difference between the transformed current image segment and a reference image segment;

a luminance compensation circuit for receiving both the reference image and the transformation coefficients and calculating a predicted image segment by implementing the transformation according to these coefficients, a coding circuit coding the difference between the current image segment and the predicted image segment to get coded data; and a multiplexing circuit for multiplexing coded data with transformation coefficients.

17. Device for coding digital data from a sequence of video images comprising:

a motion estimation circuit, a luminance estimation circuit, a motion and luminance compensation circuit, a multiplexing circuit for multiplexing said residue with at least said transformation coefficients to form a bitstream.

18. Device for decoding data, said data comprising residue data and transformation coefficients, said device comprising:

means for reconstructing an image from said residue data and a predicted image to get a reconstructed image, means for compensating the luminance of a previous reconstructed image according to said transformation coefficients to get said predicted image.

* * * * *